Dec. 1, 1936.     R. H. CASLER     2,062,806
BRAKE MECHANISM
Original Filed Nov. 22, 1932
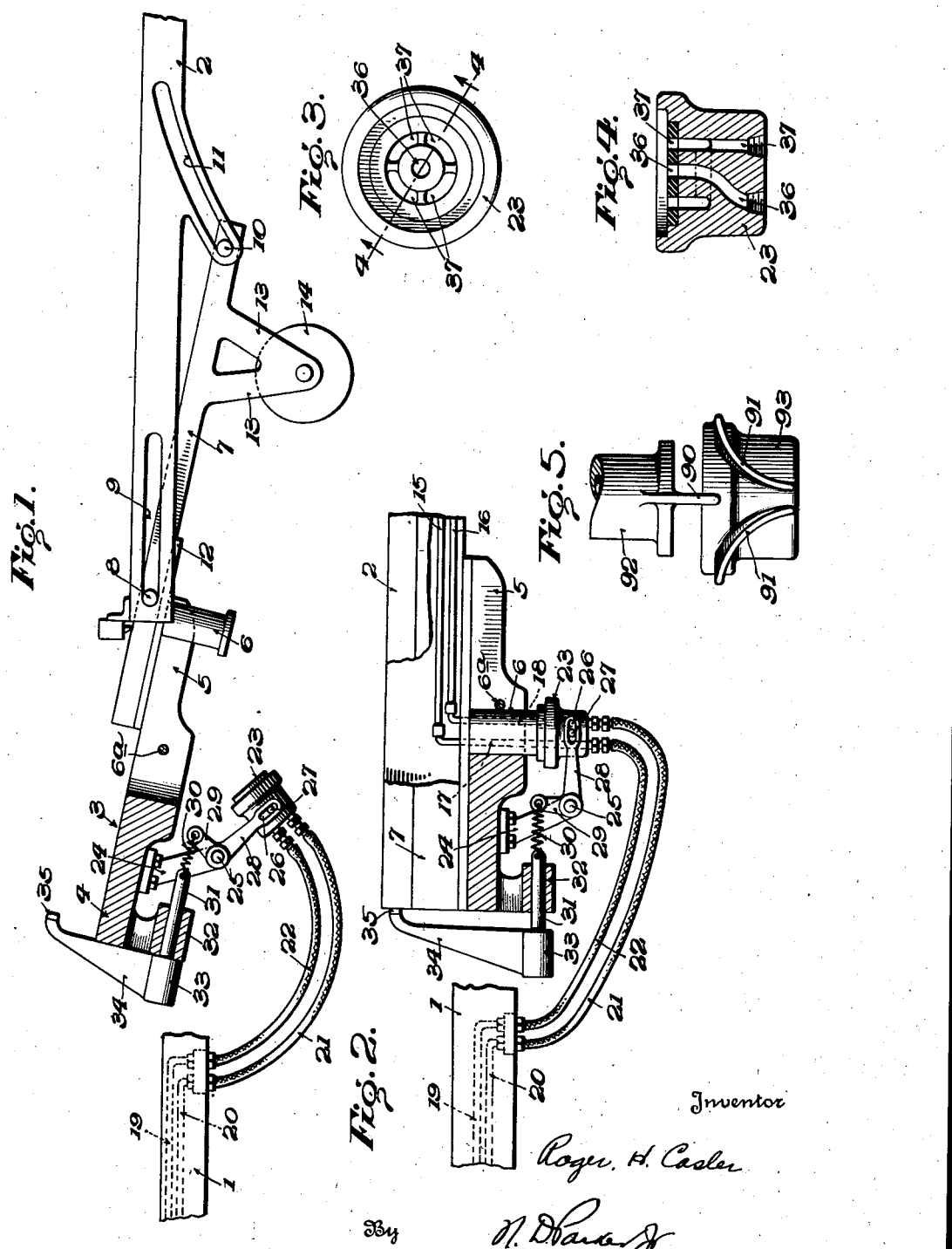
Inventor
Roger H. Casler
By
N. Davis Jr.
Attorney Patented Dec. 1, 1936

2,062,806

UNITED STATES PATENT OFFICE 2,062,806

BRAKE MECHANISM

Roger H. Casler, Pittsburgh, Pa., assignor to Bendix-Westinghouse Automotive Air Brake Company, Pittsburgh, Pa., a corporation of Delaware Continuation of application Serial No. 643,902, November 22, 1932. This application October 24, 1934, Serial No. 749,837

6 Claims. (Cl. 280—33.1)

The present invention relates to tractor and trailer vehicles, and more particularly to means for coupling and uncoupling said vehicles and the hose lines or other connections therebetween.

It has heretofore been proposed, in the art relating to tractor-trailer vehicle trains, to simplify the coupling operation, and for the most part, the structures heretofore provided have effected the coupling operation by backing the tractor onto the trailer, the fifth wheel devices on the two vehicles then locking to effect the connection. However, if fluid pressure, vacuum or electric brakes are employed on the two vehicles, it has been necessary heretofore for the driver to manually effect a connection between the hose lines or electrical conductors on the two vehicles.

One of the objects of the present invention is to provide means for automatically connecting the hose lines or electrical conduits carried by the tractor and trailer vehicles respectively.

Another object of the invention is to provide means for automatically connecting the hose lines or electrical conduits on the tractor and trailer vehicles respectively when the two vehicles are brought together for mechanical connection.

A further object is to provide, in connection with vehicle trains including a vehicle of the type employing a trailer sub-frame construction, means for automatically connecting the hose lines or electrical conduits of the vehicles when the trailer sub-frame is moved rearwardly during the coupling operation with the tractor.

A further object is to provide, in connection with a vehicle of the type employing a trailer sub-frame construction, means for automatically connecting the hose lines of the tractor and trailer vehicles, which automatic connection will be effected at the end of the rearward movement of the trailer sub-frame.

A still further object is to provide automatically operated connecting means for the conduits carried by the tractor and trailer vehicles, which will be self-aligning in order to provide an exact and ready connection between such conduits.

A still further object is to provide a novel connection element for use in the automatic coupling of hose lines carried by tractor and trailer vehicles, which element will be so formed as to provide a positive and constantly open connection between such hose lines.

Other novel features of the invention will be more fully understood from the following detailed description when taken in connection with the accompanying drawing. It is to be expressly understood, however, that such drawing is for purposes of illustration only and is not to be taken as a definition of the limits of the invention, reference being had for such purpose to the appended claims.

Referring to the drawing, wherein similar reference numerals refer to like parts throughout the several views:

Fig. 1 is a view showing parts of tractor and trailer vehicles in position for connection, and showing elements of the present invention in their inoperative position;

Fig. 2 is a view showing parts disclosed in Fig. 1 in their connected and operative positions;

Fig. 3 is a plan view showing a proposed arrangement of one of the elements of the coupling;

Fig. 4 is a sectional view taken on the line 5—5 of Fig. 3, and

Fig. 5 is a view showing a modified construction of elements of the invention disclosed in other figures.

Referring to the drawing and more particularly to Fig. 1 thereof, the present invention is disclosed in association with a tractor vehicle having a frame 1 adapted to be connected to a trailer vehicle having a main frame 2. In accordance with the usual construction, the tractor vehicle is provided with a fifth wheel device 3, the same being of well known design including a body portion 4 and rearwardly extending arms 5 which define a rearwardly opening slot for receiving the trailer-carried king-pin 6. The trailer vehicle construction disclosed in Fig. 1 is of that type which employs a sliding trailer sub-frame 7. The sub-frame is preferably supported on the trailer main frame by bolts or pins 8 carried by the sub-frame and positioned in horizontal slots 9 formed in the trailer main frame at the forward portion thereof, and also by bolts or pins 10 on the rear portion of the sub-frame and positioned in arcuate, upwardly-inclined slots 11 formed in the trailer main frame 2. The under side of the forward end of the sub-frame is provided with a trailer fifth wheel device, the same carrying at its center the depending king-pin 6 in the usual manner. The rear portion of the sub-frame is provided with downwardly-extending arms 13 carrying the trailer loading wheels 14. It will be apparent from the above described construction that as the tractor fifth wheel device 3 moves rearwardly after engaging the trailer king-pin 6, the trailer sub-frame 7 will be moved rearwardly, the pins 8 and 10 riding respectively in the slots 9 and 11, and the disposition of the slot 11 causing the trailer loading wheels 14 to be raised out of contact with the ground.

In the event that the tractor and trailer vehicles are both equipped with fluid pressure operated brakes, a connection between the braking system on the tractor and that on the trailer must be made in order to operate the trailer brakes after the tractor and trailer have been coupled. According to the present invention, the usual fluid pressure braking system on the trailer main frame is connected by flexible tubing, not shown, to the pipes 15, 16 carried by the trailer sub-frame. Such pipes 15, 16 may be connected by any suitable means to passages 17, 18 bored longitudinally through the king-pin. On the tractor vehicle, the fluid pressure braking system carried thereby, and including the pipes 19, 20, may be connected by any suitable means, such as flexible tubing 21, 22, to an "air line" socket 23, the same being provided with passages formed longitudinally therethrough with which the flexible tubes 21, 22 may be connected. It will be apparent that in order to operate the trailer brakes on coupling of the tractor and trailer vehicles the passages formed in the "air line" socket 23 must be connected to those formed in the king-pin 6.

Means are provided by the present invention for automatically causing the abutment of the "air line" socket 23 and the king-pin 6 for connecting the tractor and trailer braking systems, such automatic operation being caused by the relative movement which occurs between the trailer main frame and sub-frame when the tractor and trailer vehicles are being coupled. Such means comprise a bracket 24 bolted or otherwise secured to the under side of the tractor fifth wheel device and having pivotally connected thereto at its lower extremity a bell crank lever 25, the longer arm 28 of which normally extends downwardly and supports the "air line" socket 23 by means of elongated slots 26 surrounding pins 27 formed on the exterior of said socket. The shorter arm 29 of the bell crank lever normally extends upwardly and is connected at its outer extremity by a spring 30 to a rod 31 which is slidably fitted in a bracket 32 formed on the under side of the tractor fifth wheel device 3. Rod 31 has, formed integrally therewith or connected thereto by any suitable means, an abutment member 33 which is vertically disposed at the forward end of the tractor fifth wheel device and carries an upwardly extending portion 34, terminating in an offset portion 35.

In order to permit relative turning movement between the tractor and trailer vehicles without affecting the relation between arm 34 and the end of the trailer vehicle 2, the forward end of the trailer vehicle may be curved rearwardly about a vertical axis or, if desired, said forward end may be provided with a strip, of metal or other material, curved in the same manner, either of these constructions providing an arcuate surface against which the offset portion 35 is adapted to bear.

In the operation of the above described structure, when the tractor 1 and trailer 2 are to be coupled together, the tractor, including the fifth wheel device 3 carried thereby is moved rearwardly in such a manner that the king-pin 6, carried by the trailer is received in the space or slot defined by the arms 5 of the tractor fifth wheel device. No relative movement between the trailer main frame and the sub-frame will take place until the tractor fifth wheel device has moved back as far as possible relatively to the trailer sub-frame, and these two parts are in their relative positions as shown in Fig. 2. At this time the tractor and trailer fifth wheel devices may be locked together but the trailer sub-frame is still in the position disclosed in Fig. 1 and has not yet begun to move rearwardly. Further rearward movement of the tractor vehicle will now take place and pins 8 and 10 on the sub-frame will move rearwardly in slots 9 and 11, whereby the sub-frame 7 will be moved rearwardly and raised to a horizontal position. As the tractor, tractor fifth wheel, and trailer sub-frame all move rearwardly, the vertically-extending arm 34 will move therewith until it abuts, at its upper end, the trailer main frame 2, as disclosed in Fig. 2. As soon as this occurs, further rearward movement of the extension 34 and rod 31 will cease, the bracket 32 then sliding over the rod 31 during continued rearward movement of the tractor and tractor fifth wheel device.

During such movement, the tractor, tractor fifth wheel device, and trailer sub-frame will carry with them the bracket 24, bell crank 29 and "air line" socket 23. The relative movement between these parts and the rod 31 and extension 33, 34 will result in the tensioning of the spring 30 whereby the bell crank lever 25 will be rotated in a counterclockwise direction, thereby moving the "air line" socket 23 upwardly until, at the point when the sub-frame 7 is in its most rearward and upward position, the "air line" socket will be in alignment with the lower face of the king-pin 6 and will be held firmly against the same by the tension of spring 30.

It will be noted that the "air line" socket is capable of rotation about its own longitudinal axis due to the provision of the slot and pin connection between such socket and the arm 28 of the bell crank lever. Such construction is necessary in order to insure alignment of the ports in the socket and those in the king-pin. In order to facilitate and insure such alignment of these ports, the said socket may be constructed as disclosed in Figs. 3 and 4, wherein ports 36, 37 are provided to which the flexible hose lines 21, 22, leading to the tractor fluid-pressure braking system, may be connected. Port 36 extends through the socket and opens, at the upper side thereof, in the center of the socket while port 37 is connected to an annular recess in the socket which opens on the upper face thereof. With such a construction, and with proper placing of the ports in the king-pin, registry of the socket ports and the ports in the king-pin is insured once the two elements are concentrically brought together. In order to insure that the king-pin and "air line" socket are brought together concentrically, the king-pin device 92, as disclosed in Fig. 5, may be provided with a radially and downwardly extending fin 90. As also disclosed in this figure, the socket 93 may be provided with downwardly-converging guide members 91. It will be apparent from this construction that when the socket is brought upwardly toward the king-pin device, the guides 91 will abut the fin 90 in the event that the king-pin and socket are not concentrically aligned and, due to the convergence of the guides 91 with respect to the center line of the socket, the two elements will be concentrically brought together as the socket is raised.

In order to positively lock the king-pin in position, a suitable pin or bolt 6a may be inserted within suitable openings provided in the arms 5, see Fig. 2.

While one embodiment of the invention has been illustrated and described and reference has been made to fluid pressure operated brakes, it is to be understood that the invention may be readily employed with vehicles utilizing vacuum braking systems as well as electrical braking systems. It is therefore expressly understood that the invention is in no way limited other than by the appended claims, to which reference will be had for determining the limits thereof.

This application is a continuation of application Serial No. 643,902, filed November 22, 1932, for Brake mechanism.

What is claimed is:

1. In combination, a tractor vehicle, a trailer vehicle, fluid conduits on said tractor and trailer respectively, coupling means on said tractor including a fifth wheel device, coupling means on said trailer including a king-pin device, means pivotally mounted on said fifth wheel device and connected to said tractor-carried conduits, and means operable during relative longitudinal movement between said tractor and trailer vehicles during the coupling thereof for moving said fifth wheel carried means about its pivotal mounting into engagement with said king-pin device for connecting said tractor and trailer-carried conduits.

2. In combination, a tractor vehicle, a trailer vehicle, fluid conduits on said tractor and trailer respectively, coupling means on said tractor including a fifth wheel device, means pivotally mounted on said fifth wheel device and connected to said tractor carried conduits, means slidably mounted on said fifth wheel device and connected to said pivotally mounted means, coupling means on said trailer including a king-pin device connected to said trailer carried conduits, and means carried by said slidably-mounted means for engagement by said trailer vehicle during coupling of said tractor and trailer vehicles.

3. In combination, a tractor vehicle having a fluid conduit, a trailer vehicle having a fluid conduit, coupling means for connecting the vehicles including a king pin device on the trailer, means for connecting said device to the trailer conduit, and connecting means for the conduits to establish communication therebetween, including said king pin device on the trailer vehicle, a part pivotally mounted on the tractor vehicle, and a device carried by one of said vehicles operable by relative movement of the two vehicles to yieldingly move said part about its pivotal mounting into engagement with the said king pin device.

4. In combination, a tractor vehicle having a fluid conduit, a trailer vehicle having a fluid conduit, coupling means for connecting the vehicles including a king pin device on the trailer, means for connecting said device to the trailer conduit, and connecting means for the conduits to establish communication therebetween, including said king pin device on the trailer vehicle, a part pivotally mounted on the tractor vehicle, and a device carried by one of said vehicles operable incident to coupling action of the coupling means to yieldingly move said part about its pivotal mounting into engagement with the king pin device, and comprising a spring member the aforesaid yielding action of which is caused by movement of one vehicle during relative movement of the two vehicles when being coupled together.

5. In combination, a tractor having a fluid conduit, a trailer having a fluid conduit, fifth wheel coupling means intermediate said tractor and trailer including a king pin on the trailer and a fifth wheel device on the tractor to receive said king pin when the tractor and trailer are coupled together, and connecting means for the fluid conduits aforesaid comprising nozzle and socket parts associated with the respective king pin and fifth wheel members aforesaid and including actuating parts operable as the king pin member assumes its coupled position with respect to the fifth wheel member for inter-engaging said nozzle and socket parts, and including also a yielding member cooperating with one of the nozzle and socket parts to hold these parts together, the yielding effective action of said yielding member being increased by coupling cooperation between the trailer and tractor as said coupling cooperation takes place.

6. In combination, a tractor vehicle, a trailer vehicle, fluid conduits on said tractor and trailer respectively, coupling means on said tractor including a fifth wheel device, coupling means on said trailer including a king pin device, means pivotally mounted on said tractor and connected to said tractor-carried conduits, and means operable during relative longitudinal movement between said tractor and trailer vehicles during the coupling thereof for yieldably moving said tractor-carried means about its pivotal mounting into engagement with said king pin device for connecting said tractor and trailer-carried conduits.

ROGER H. CASLER.